D. LOMBARD.
Rice Polishing Machine.
No. 29,893. Patented Sept. 4, 1860.
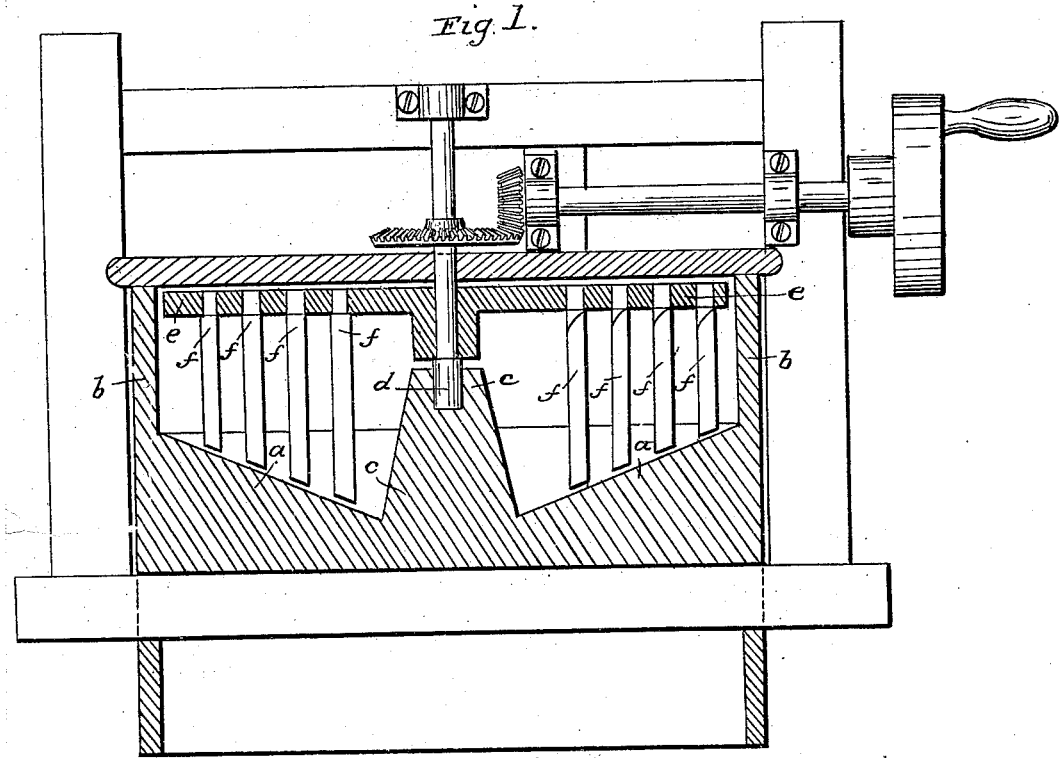
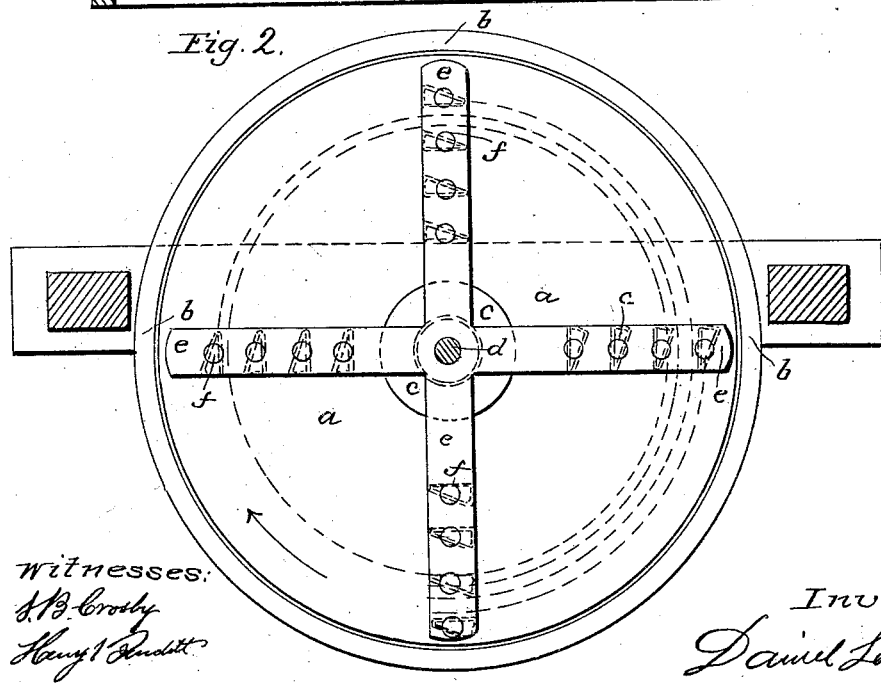

UNITED STATES PATENT OFFICE.

DANIEL LOMBARD, OF BOSTON, MASSACHUSETTS.

MACHINE FOR POLISHING RICE.

Specification of Letters Patent No. 29,893, dated September 4, 1860.

*To all whom it may concern:*

Be it known that I, DANIEL LOMBARD, of Boston, in the county of Suffolk and State of Massachusetts, have invented a new and useful Machine for Polishing the Grains of Rice after the Colored Skin or Inner Cuticle has been Removed Therefrom; and I do hereby declare that the following, taken in connection with the drawings which accompany and form part of this specification, is a description of my invention so full and exact as to enable those skilled in the art to practice it.

The object of my invention is to polish the surface of the grains of rice, after the colored skin or inner cuticle has been removed, in order to improve the appearance of the rice, and to increase its salability. Its nature consists in the peculiar arrangement and combination of yielding surfaces, or surfaces covered with yielding material, which I employ, by which the desired result is accomplished, quicker and more uniformly than has hitherto been done.

The receptacle in which the rice is placed to be operated upon, has a dishing, conical or concave bottom, from the outer and highest edge of which rises, either vertically or inclining inward, the outer boundary of the rice tub. In the center of this, and surrounding or forming a step for the rotating shaft which carries the stirrers, is fixed a conical piece, with its base upon the dishing bottom of the tub. These surfaces, which are stationary, are covered with some yielding material; I prefer to use what is generally known as buck-skin.

The rotating shaft has fixed to it, arms, which carry the stirrers. These are pendent from the arms, and are so arranged that the space between the paths described by two adjacent stirrers on any one arm, is subdivided by the paths of those fixed to the other arms. The best shape for the stirrers, is that of a triangular prism, and they should be located so that one of the sides of each stirrer should incline inward toward the center, from a tangent to the circular path described by the stirrer, and in the direction of its rotation. The stirrers are covered with buck-skin, or some other yielding material, and should regularly subdivide the space between the inner and outer walls of the rice tub. One stirrer should be located so near the central cone that the grains of rice may fall from contact with it, into the wake or path of the stirrer; but it should be observed, that none of the stirrers are to be placed so near the walls of the tub, as to catch and crush the rice.

The operation of this mechanism is to impel the rice constantly outward from the center of the tub, while it as constantly gravitates back again, thus continually changing the position of each grain, and by the rubbing of these upon the yielding surfaces, and against each other, the necessary amount of friction and abrasion is produced, to impart a high polish to the rice.

Figure 1, is a vertical, sectional elevation of a polishing machine embodying my invention. Fig. 2 is a plan of the same, with the covers and rotating gearing removed to exhibit the parts in which my improvement is embodied.

*a*, is the inclined bottom of the rice tub; *b*, its outer boundary, and *c*, the cone surrounding the shaft (*d*) which steps therein. The surfaces of these parts are covered with buck-skin, or other equivalent yielding material. The arms (*e*) are secured to and rotated by the shaft (*d*) carrying with them the stirrers (*f*) which are fixed to the arms, and are shaped, located and covered as heretofore described.

What I claim as new, and desire to secure by Letters Patent of the United States is—

The combination of the surfaces, *a*, *b*, and *c*, with stirrers (*f*) when all of these are covered with buckskin, or other equivalent yielding material, and are of the form and relative arrangement described, operating together as specified, to polish the grains of rice.

June 18th, 1860.

DANIEL LOMBARD.

Witnesses:
J. B. CROSBY,
HENRY BURDITT.